United States Patent
Klein et al.

(10) Patent No.: US 12,299,390 B2
(45) Date of Patent: May 13, 2025

(54) CONTEXT-BASED TEXT SUGGESTION

(71) Applicant: Google LLC, Mountain View, CA (US)

(72) Inventors: Daniel V. Klein, Pittsburgh, PA (US); Igor dos Santos Ramos, Round Rock, TX (US)

(73) Assignee: GOOGLE LLC, Mountain View, CA (US)

( * ) Notice: Subject to any disclaimer, the term of this patent is extended or adjusted under 35 U.S.C. 154(b) by 463 days.

(21) Appl. No.: 17/339,361

(22) Filed: Jun. 4, 2021

(65) Prior Publication Data

US 2022/0391584 A1 Dec. 8, 2022

(51) Int. Cl.
*G06F 40/274* (2020.01)
*G06F 40/166* (2020.01)
*G06F 40/284* (2020.01)
*G10L 15/00* (2013.01)

(52) U.S. Cl.
CPC .......... *G06F 40/274* (2020.01); *G06F 40/166* (2020.01); *G06F 40/284* (2020.01); *G10L 15/005* (2013.01)

(58) Field of Classification Search
CPC ..... G06F 3/00; G06F 3/01; G06F 3/02; G06F 3/023; G06F 3/0233; G06F 3/0237; G06F 3/048; G06F 3/0481; G06F 3/0482; G06F 40/00; G06F 40/103; G06F 40/117; G06F 40/166; G06F 40/174; G06F 40/186; G06F 40/20; G06F 40/205; G06F 40/216; G06F 40/263; G06F 40/274; G06F 40/279; G06F 40/284; G06F 40/289; G06F 40/295; G06F 40/30; G10L 15/00; G10L 15/005; G10L 15/08; G10L 15/18; G10L 15/1815; G10L 15/26; H04L 65/40; H04L 65/401; H04L 65/4015; G06Q 10/00; G06Q 10/109; G06Q 10/1093; G06Q 10/1095
See application file for complete search history.

(56) References Cited

U.S. PATENT DOCUMENTS

| | | |
|---|---|---|
| 9,824,335 B1 | 11/2017 | Vander Mey |
| 10,613,825 B2 | 4/2020 | Moorjani et al. |
| 10,635,748 B2 | 4/2020 | Liu et al. |
| 2007/0129942 A1* | 6/2007 | Ban ........................ G06F 40/169 704/235 |
| 2009/0044623 A1* | 2/2009 | Matsumoto ........... G06F 40/274 707/999.005 |
| 2014/0163954 A1* | 6/2014 | Joshi ....................... G06F 3/0237 704/9 |
| 2014/0279793 A1* | 9/2014 | Wohlstadter ......... G06Q 30/0277 706/46 |
| 2016/0268254 A1* | 9/2016 | Akaike ................. H01L 29/7809 |
| 2016/0269254 A1* | 9/2016 | Forney .................. H04L 65/403 |
| 2017/0161399 A1* | 6/2017 | DeLuca ................. G06F 40/14 |

(Continued)

*Primary Examiner* — Hai Phan
*Assistant Examiner* — Alexander Joongie Kim
(74) *Attorney, Agent, or Firm* — DORITY & MANNING P.A.

(57) ABSTRACT

Generating text suggestions based on context can leverage sources associated with the context to generate more accurate and informed text suggestions. For example, the context can be a user situation, such as the user is attending a meeting. Obtaining text from sources associated with the user situation can generate a corpus of text that can be leveraged for generating the context-based text suggestions.

20 Claims, 10 Drawing Sheets

(56) References Cited

U.S. PATENT DOCUMENTS

| | | |
|---|---|---|
| 2018/0032499 A1 | 2/2018 | Hampson et al. |
| 2018/0101599 A1* | 4/2018 | Arnold ................. G06F 16/338 |
| 2018/0248970 A1 | 8/2018 | Lepeska et al. |
| 2019/0273767 A1* | 9/2019 | Nelson ................ H04M 7/0027 |
| 2020/0403817 A1* | 12/2020 | Daredia ................ G06F 16/345 |
| 2020/0403818 A1* | 12/2020 | Daredia ................. G10L 17/00 |
| 2021/0051185 A1 | 2/2021 | Caston et al. |
| 2021/0182020 A1* | 6/2021 | Kanuganti .............. G06F 3/167 |
| 2023/0177257 A1* | 6/2023 | Peleg .................... G06N 3/084 |
| | | 715/255 |

* cited by examiner

CONTEXT-BASED TEXT SUGGESTION

FIELD

The present disclosure relates generally to providing text suggestions based on a determined user situation. More particularly, the present disclosure relates to generating and providing a text suggestion based at least in part on sources associated with a meeting or other situation.

BACKGROUND

Text suggestions including autocompletion and prediction can be overly general or too focused on past user text insertion. In particular, current text suggestions can fail to consider the context of the document being edited. Documents for different functions are often treated the same, which can lead to irrelevant text suggestions being suggested based purely on a generalized model. Documents like meeting notes and emails related to a meeting can involve different context and desired content than other documents being drafted by a user.

For example, typing meeting notes or drafting an email related to a meeting can include typing out portions of a dialogue, copying and pasting participant's email addresses, or generally referencing sources discussed before, after, or during the meeting. Normal text suggestion often only provides auto completion or text suggestion based on a general language model, known phrases, or past user text input. The autocompletion and text suggestions are therefore not situationally-aware of the context of the meeting notes or email.

Moreover, the drafting of meeting notes and emails related to meetings can involve opening and closing different sources to reference the sources for information to type. Navigating through different sources manually can be tedious and inefficient. Finding past references in the current document can also be a laborious task.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system including one or more processors, one or more inputs for text entry from a user. The method can include determining, by the computing system, the user is attending a meeting. The method can include determining, by the computing system, the meeting is associated with the text entry. In some implementations, the meeting can include a plurality of participants, and the plurality of participants can include the user. The method can include generating, by the computing system, a corpus of text. The corpus of text can include a plurality of textual tokens associated with the meeting. In some implementations, the textual tokens can be obtained from a one or more sources associated with the meeting. The method can include determining, by the computing system, that obtained text from the corpus of text is associated with the one or more inputs. The method can include generating, by the computing system, a text suggestion based at least in part on the obtained text and the one or more inputs and providing, by the computing system, the text suggestion for display.

Another example aspect of the present disclosure is directed to a computing system. The computing system can include one or more processors and one or more non-transitory computer readable media that collectively store instructions that, when executed by the one or more processors, cause the computing system to perform operations. The operations can include receiving one or more inputs to edit a document from a user and determining a user situation. The operations can include determining the user situation is associated with the document. The operations can include generating a corpus of text. In some implementations, the corpus of text can include a plurality of characters associated with the user situation, and the plurality of characters can be obtained from one or more sources associated with the user situation. The operations can include determining that one or more characters from the corpus of text are associated with the one or more inputs. The operations can include generating a text suggestion based at least in part on the one or more characters and the one or more inputs and providing the text suggestion for display.

Another example aspect of the present disclosure is directed to one or more non-transitory computer readable media that collectively store instructions that, when executed by one or more processors, cause a computing system to perform operations. The operations can include receiving one or more inputs to edit a document from a user. The operations can include determining a user-attended meeting is associated with the document. In some implementations, the user-attended meeting can include a plurality of participants, and the plurality of participants can include the user. The operations can include generating a corpus of text. In some implementations, the corpus of text can include a plurality of words associated with the user-attended meeting, and the plurality of words can be obtained from one or more sources associated with the user-attended meeting. The operations can include determining that one or more words from the corpus of text are associated with the one or more inputs. The operations can include processing the one or more inputs to determine a semantic intent and generating a text suggestion based at least in part on the one or more words and the semantic intent. The operations can include providing the text suggestion for display.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
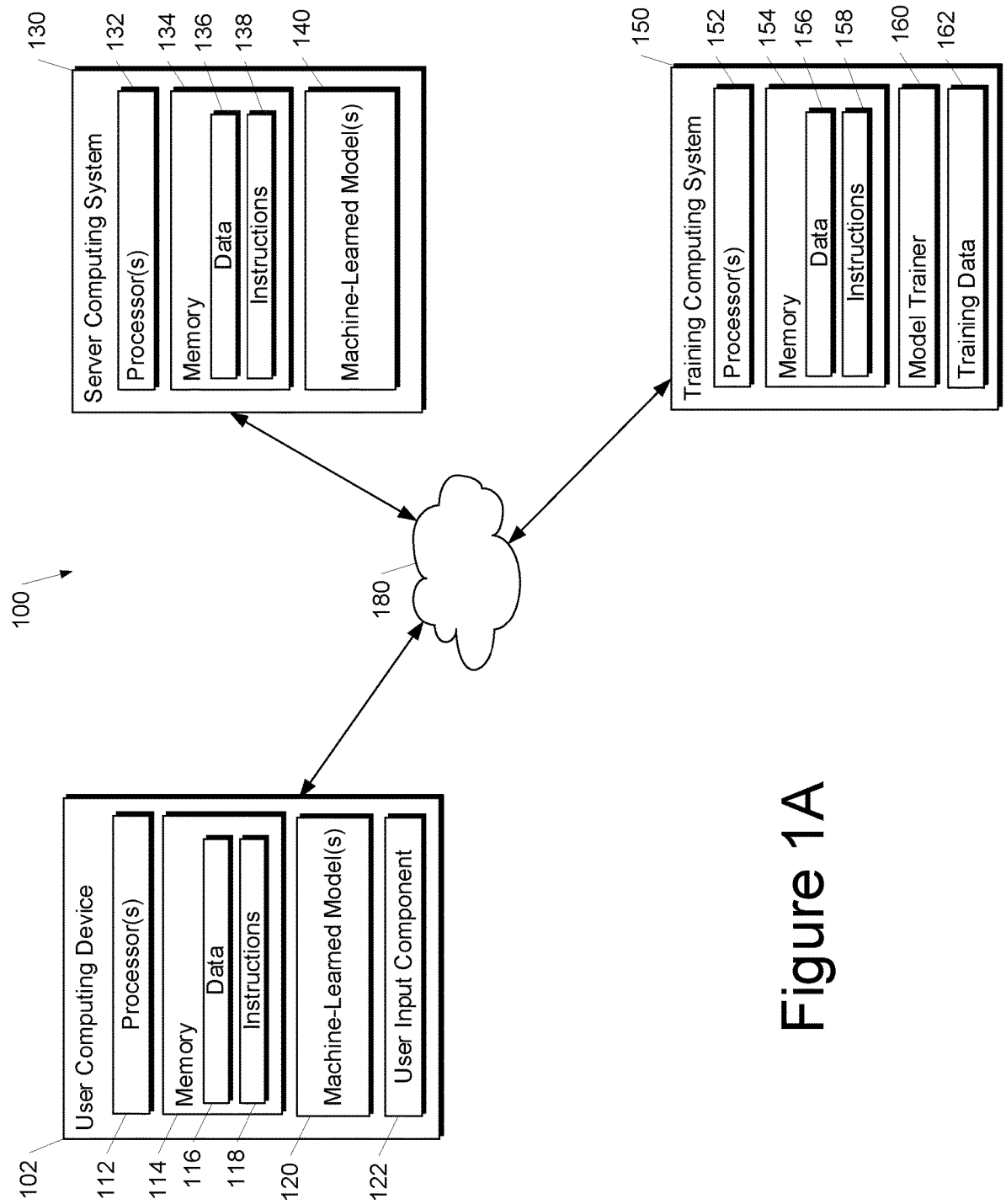
FIG. 1A depicts a block diagram of an example computing system that performs text suggestion according to example embodiments of the present disclosure.

Reference numerals that are repeated across plural figures are intended to identify the same features in various implementations.

DETAILED DESCRIPTION

Overview

Generally, the present disclosure is directed to providing context-based text suggestions. In particular, the systems and methods disclosed herein can leverage a variety of sources to provide context-based text suggestions to provide more accurate text suggestions. The systems and methods can receive one or more inputs to edit a document from a user. A user situation, or context, can be determined. The user situation, or context, can include the user attending a meeting (e.g., a work meeting, a network meeting, or a family gathering). The systems and methods can determine if the user situation, or context, is associated with the document. If the context is determined to be associated with the document, the systems and methods can generate a corpus of text, in which the corpus of text includes a plurality of text. Generation of the corpus of text can involve obtaining text from a plurality of sources associated with the user situation, or context. The systems and methods can determine that obtained text from the corpus of text is associated with the one or more inputs and generate a text suggestion based on the obtained text and the one or more inputs. In some implementations, the one or more inputs can be processed to determine a semantic intent, which can be used to determine an association with the obtained text and one or more inputs, which can then be used to generate a text suggestion. The text suggestion can then be provided for display.

Editing a document can include drafting an email, creating meeting notes, drafting a text message, creating a calendar event, adding to a pre-existing text file, etc. Generally, the systems and methods can be utilized to provide context-based text suggestions in response to any form of text entry by a user. The context of a document or text entry can relate to a user situation, which can include a meeting attended by a user, a time of day, a location, a language being communicated, and/or a variety of other user situations that can provide more specific context.

The context of a document can be that the document is being drafted with relation to a meeting or other user situation. Drafting documents related to or associated with meetings can often involve summarizing the meeting, adding notes to contact attendees, mentioning the title of the meeting, or discussing outside sources reviewed before, during, or after the meeting. Autocompletion and text prediction in documents are often focused on words or phrases repeatedly used by the user and can fail to factor in the situation in which the document is being drafted. The systems and methods disclosed herein can determine and provide text suggestions based on a document being drafted in association with a user-attended meeting or another user situation. More specifically, the systems and methods can determine a user has a meeting scheduled based on a meeting scheduled on a calendar or based on communications between the user and other participants (e.g., emails between participants, a calendar invite, or a meeting showing up on a joint calendar). The systems and methods may determine a user has joined a meeting even if a meeting was not scheduled. Determining a meeting has been joined can involve determining the user has opened a meeting in a video-conference platform (e.g., a web-based application or a web service) or if one or more of the user's devices are in proximity to a meeting location or in proximity to other meeting participants. The device location can be determined through geolocation using GPS, Bluetooth Low-Energy Beacons (BLEBS), WiFi, cell tower multilateration, or another location technique. The meeting can then be associated with a document opened by the user during the meeting or proximate to the meeting time. Alternatively and/or additionally, the document can be associated with a meeting based on the document being attached or referenced in a meeting invite or meeting communication. The document may be associated with a meeting based on past user interactions with that particular document or other related documents. In some implementations, the contents of the document including new user inputs can be processed to determine if the document is associated with a meeting or another particular user situation.

In some implementations, the systems and methods can determine other user situations based on a user's location, a time of day, or a language spoken or typed by a user. For example, a user's devices can be located for determining a user's location. The location may be determined to be associated with a plurality of sources, including previous documents drafted at that location, webpages previously or currently looked at that concern a location proximately located to the location of the user, and/or emails related to the document. For example, a user may edit or view one or more documents from a particular folder frequently when in a certain determined location. Therefore, the systems and methods may associate the documents from that folder with the determined certain location. Those documents can then be used to generate a corpus of text to be used for generating text suggestions for when the user edits documents in the determined location.

Alternatively and/or additionally, a time of day can be used for determining and generating tailored text suggestions. For example, the systems and methods can determine that a certain time of day, week, month, or year is associated with certain actions. The certain actions can be viewing certain websites, editing certain documents, sending/receiving certain emails, etc. The certain actions can then be used to determine sources for obtaining text to be used to generate a corpus of text to be used to generate text suggestions for documents edited at the determined time. For example, a user may create, add to, or open a document for writing a sports synopsis every day at 9:15 AM ET. The user may view certain websites frequently at that time for gathering information. Moreover, the user may receive frequent emails about the results of games from the previous day. The systems and methods can use text from the previous sports synopsis, from the webpages of the websites, from the emails, and from other sources related to sports events or that particular time of day to generate a corpus of text. The corpus of text can then be used for text suggestion to allow the user to more efficiently draft their sports synopsis.

In some implementations, language used by the user can be determined as a user situation. In particular, speech data or text data may be obtained and processed to determine a language used by the user. The corpus of text used for text suggestion can then be adjusted based on the determined language. For example, a user may use English when communicating with their family or completing personal tasks and may use Japanese when communicating with work associates or completing work tasks. Therefore, when a user is typing or speaking in English, the text suggestions can be based on a personal corpus of text that includes text obtained from communications with family members, shopping lists, personal to do lists, and/or social media websites. While, when the user is typing or speaking in Japanese, the text suggestions can be based on a work corpus of text that includes text obtained from work emails, work related communications, documents in work related folders, and/or the business's webpage.

Alternatively and/or additionally, in some implementations, the corpus of text may stay the same, but the text suggestions may include translated versions of the obtained text.

The document can be shared with the other meeting participants or can be solely authored by the user. The document can be used to transcribe meeting notes, generate a meeting summary, or draft a to do list. Based on the document's association with the meeting, text suggestions related to or associated with the meeting may be generated and provided to aid in drafting the document. For example, the meeting title may be provided as a suggested document title.

Association of the document with a meeting or user situation can be determined by the meeting/user situation and document edits occurring at the same time or at the approximate same time. In some implementations, association between the document and user situation can be determined by the past user interactions by the user (e.g., a user editing a document during past meeting times of a recurring meeting or drafting an email during past similar user situations). If a same document is edited frequently during meetings, the document may be associated with the meeting such that a corpus of text associated with the meetings may be used for generating text suggestions. In some implementations, meetings with the same title or participants list can be associated with the same or similar documents and sources. In some implementations, the corpus of text can be individually attached to the document; however, in some implementations, the corpus of text can be shared between documents, different users, and instances. The corpus of text can be attached to a user situation (e.g., a meeting), one or more users, and/or one or more documents. In some implementations, the corpus of text may be generated during every new instance of text input or may be continually modified as more instances of text input occur.

Alternatively and/or additionally, an email being drafted can be determined as associated with a meeting based on the subject line, the contents of the email, the "to" and "from" lines, etc.

The text suggestions can be generated and provided by the system based on one or more characters obtained from various sources associated with the meeting (e.g., a meeting transcript, an invitation email, websites viewed before or during the meeting, a participants list, etc.). Moreover, the text suggestions may be derived or based on a corpus of text generated by the system. The corpus of text may be generated by obtaining text from various sources associated with the meeting. For example, the transcription of the videoconference meeting may be analyzed to obtain text to be added to the corpus of text. Additionally and/or alternatively, one or more webpages viewed before or during the meeting may be analyzed to obtain key terms for adding to the corpus of text.

The corpus of text can be generated by obtaining a plurality of sources. The sources can be emails, the content of the document, other documents, webpages, calendars, and/or meeting transcripts. Obtaining text can include obtaining characters from particular areas of a source or can include obtaining characters holistically from the source. Obtaining text can include processing the source to determine keywords and phrases in the source and obtaining the keywords and phrases. Moreover, in some implementations, the plurality of sources can include closed caption data descriptive of a videoconference and/or can include one or more emails. The one or more emails may be addressed to one or more of the participants or may be from one or more of the participants. Alternatively and/or additionally, the plurality of sources can include previously edited documents. The previously edited documents can be documents referencing the determined meeting or other user situation. In some implementations, the previously edited document can be one or more documents previously edited during the meeting or past similar meetings. In some implementations, text from other portions of the edited document can be obtained to add to the corpus of text.

Additionally and/or alternatively, the systems and methods can determine a webpage is associated with the meeting or other user situation based on the webpage being visited during, before, or after the meeting. In some implementations, the webpage may be associated with the meeting or other user situation based on the webpage having related terms to the meeting, other user situation, or other sources.

The obtained text can be weighted based on the timeliness of the source, the time of source, and/or the relevance of the source. For example, a transcript or closed caption of a meeting may receive a more favorable weight relative to other sources, which can lead to text suggestions based on a transcript being more likely to be provided for display. Moreover, webpages with a link in the document may be weighted to provide a priority to the webpage with the included link over other webpages. Shortened links (e.g., shortened URLs or link aliases) can be weighted higher than typed in URLs, and webpages visited based on a typed in URL may be weighted differently than webpages visited based on a clicked URL. In some implementations, the time in which a source is viewed may be used to weight the text obtained from the source (e.g., the longer the source is opened, the more favorable the weighting). For example, a skimmed webpage may be weighted less than read pages.

Weighting related to the obtained text can be based on a timeliness of the source. In some implementations, there can be a threshold for timeliness, such that if the source is not recent as determined by the threshold for timeliness the obtained text is not considered, and obtained text from a recent source is considered. The systems and methods may assign a weight based on a decay system such that the longer ago the source was visited, the less weight the obtained text may be given.

Relevance or association level of the source and the occurrence of the related terms in the source may be other factors that affect the weighting of the obtained text for text suggestion. For example, a social media webpage visited during a meeting is likely to have less related terms than a research webpage visited to provide information on a meeting topic. Therefore, the obtained text from the research webpage can be weighted more favorably than the social media webpage.

After a corpus of text is generated, updated, or modified, the input entered by the user may be analyzed to determine if the input relates to or is associated with any text in the corpus of text. If the input is determined to be related to or associated with any text from the corpus of text, the system can generate a text suggestion based on the input and the related text. In some implementations, the one or more inputs can be processed to determine a semantic intent, which can be used to generate the text suggestion. The text suggestion can then be provided to the user.

In some implementations, the systems and methods can determine a plurality of obtained text is associated with the one or more inputs to edit the document by the user. The plurality of obtained text can be used to generate a first text suggestion and a second text suggestion. The systems and methods may display both text suggestions or may display the text suggestion with the higher weighting. The weighting can be based on relevance, determined likelihood, or due to the source of the obtained text the text suggestion is based on. In some implementations, past selections of text suggestions based on obtained text from a source can boost the weighting of that particular source.

The text suggestion can be displayed in a variety of ways. For example, the text suggestion may be displayed in a different color than the inputted text or may be displayed as underlined, italicized, bolded, or highlighted. In some implementations, one or more text suggestions may be displayed in a drop down menu.

The systems and methods can include receiving a user selection of the text suggestion, and in response to the user selection, editing the document to include content from the text suggestion. Alternatively, the systems and methods may receive a user input indicative of a decline of the text suggestion, which can lead to the text suggestion being hidden. In some implementations, a new text suggestion may be provided in response to the previous text suggestion being removed.

In some implementations, the systems and methods disclosed herein can leverage interconnected applications for efficiency text suggestion by utilizing information from other applications used by the user that use the same log-in credentials. For example, a user may use a singular log-in or account for sending/receiving emails, for personal calendar, for generating documents, for videoconferencing, etc. The systems and methods can use the account information to generate a corpus of text based on determined situations and topics including determined meeting types.

In some implementations, obtaining text can involve parsing a document for analysis to determine keywords for generating the corpus of text. Additionally and/or alternatively, obtaining text can include determining specific nouns, verbs, and adjectives to add to the corpus of text.

In some implementations, the systems and methods can determine a hierarchy of participants, such that sources visited, opened, or created by certain participants can receive a higher weighting on obtained text than participants lower in the hierarchy.

Moreover, in some implementations, determining obtained text is associated with the one or more inputs can involve computational linguistics and probability techniques (e.g., using N-grams for analysis).

In some implementations, the corpus of text may be adjusted or weighted differently based on the document being edited (e.g., meeting notes being drafted may include more associated sources being past meeting notes).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The systems and methods of the present disclosure provide a number of technical effects and benefits. As one example, the system and methods can provide text suggestions based on text obtained from sources associated with a situation. More specifically, the systems and methods can be used to generate and provide text suggestions based on sources related to a user-attended meeting. Furthermore, the systems and methods can generate and provide text suggestions based on past edits in the current document.

Another technical benefit of the systems and methods of the present disclosure is the ability to leverage sources related to a user's location to determine pertinent text suggestions. For example, a user's location determined based on a calendar or the location of user devices can be used to determine associated documents, emails, and webpages for obtaining text for text suggestions.

Another example technical effect and benefit relates to improved computational efficiency and improvements in the functioning of a computing system. For example, certain existing systems are trained to identify text suggestions based on past user interactions. In contrast, by training a machine-learned model to generate text suggestions based on a user situation, the system can leverage more pertinent sources with a smaller corpus of text. Therefore, the proposed systems and methods can save computational resources such as processor usage, memory usage, and/or network bandwidth.

With reference now to the Figures, example embodiments of the present disclosure will be discussed in further detail.

Example Devices and Systems

FIG. 1A depicts a block diagram of an example computing system 100 that performs context-based text suggestion according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a meeting-specific computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more text suggestion models 120. For example, the text suggestion models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example text suggestion models 120 are discussed with reference to FIGS. 2, 5, 6, 7, and 8.

In some implementations, the one or more text suggestion models 120 can be received from the server computing system 130 over network 180, stored in the user computing device memory 114, and then used or otherwise implemented by the one or more processors 112. In some implementations, the user computing device 102 can implement multiple parallel instances of a single text suggestion model 120 (e.g., to perform parallel text suggestion across multiple instances of inputs for text entry).

More particularly, the systems and methods disclosed herein can be used for providing context-based text suggestions in response to one or more inputs for text entry. For example, in some implementations, one or more inputs for text entry can be received. A user situation (e.g., a user is attending a meeting), or context, can be determined, and an association between the user situation and the text entry can be determined. A corpus of text can be generated by obtaining text from one or more sources. In some implementations, the obtained text can be stored as textual tokens. The systems and methods can then determine one or more textual tokens are associated with the one or more inputs for text entry. A text suggestion based on the association with the one or more textual tokens and the one or more inputs can be generated. The text suggestion can then be provided for display.

Additionally or alternatively, one or more text suggestion models 140 can be included in or otherwise stored and implemented by the server computing system 130 that communicates with the user computing device 102 according to a client-server relationship. For example, the text suggestion models 140 can be implemented by the server computing system 140 as a portion of a web service (e.g., a text prediction service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned text suggestion models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2, 5, 6, 7, and 8.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the text suggestion models 120 and/or 140 based on a set of training data 162. The training data 162 can include, for example, a set of training data sets that can include a document for text entry associated with a training situation and one or more sources associated with the training situation. In some implementations, the training data sets can include training data sets for teaching determining an associated user situation, training data sets for teaching generating a corpus of text, and training data sets for teaching generating text suggestions based on a determined association between extracted text and one or more inputs.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML, JSON), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output. For example, in some implementations, the machine-learned model can intake speech data to generate transcript data which can be used to generate the corpus of text. Alternatively and/or additionally, the corpus of text can be used to provide context to the speech data, which can lead to more accurate and informed transcription.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output. In some implementations, optical character recognition can be run on the output of the machine-learned model to obtain one or more characters from reconstructed compressed data.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
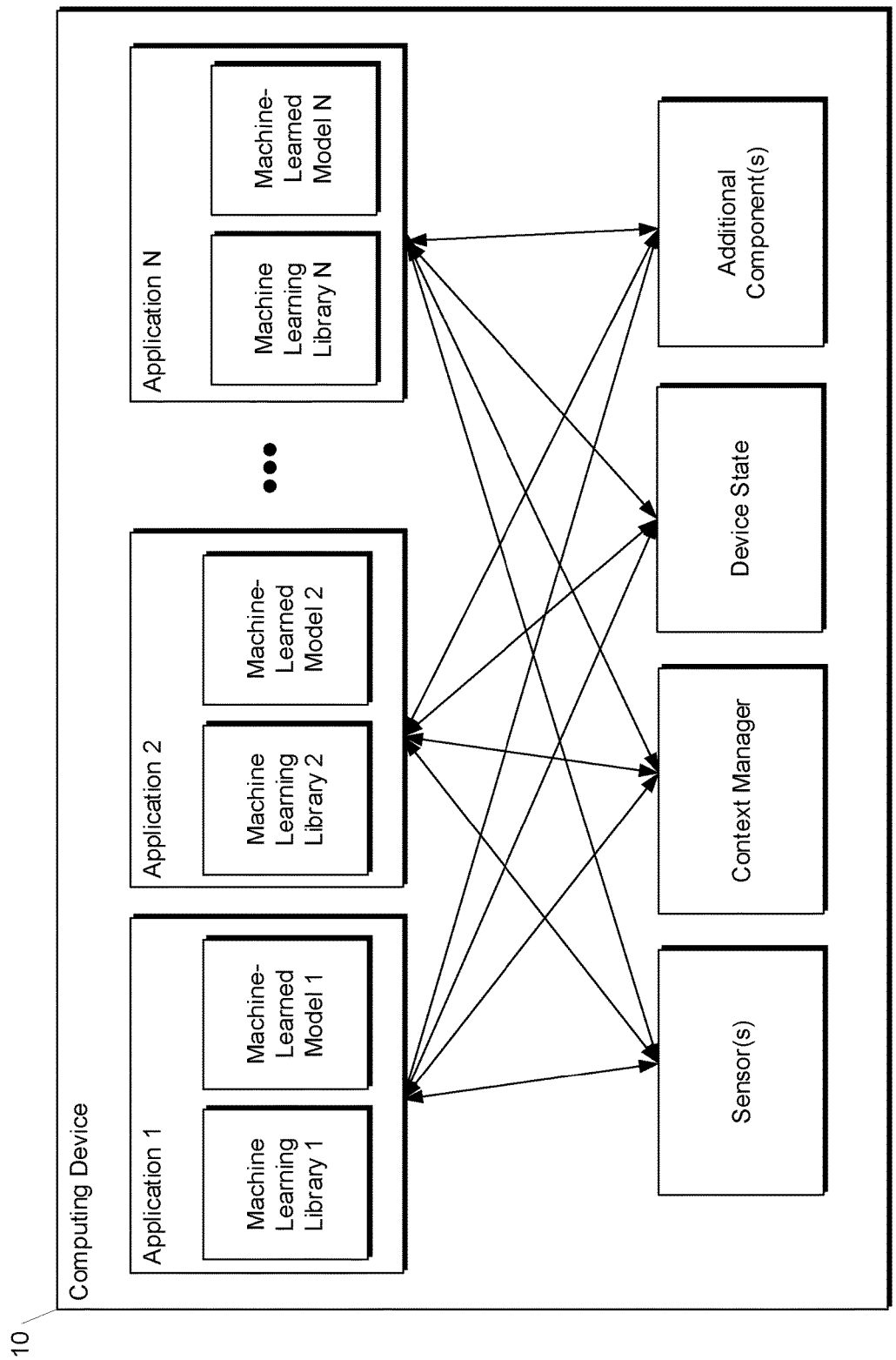
FIG. 1B depicts a block diagram of an example computing device that performs text suggestion according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
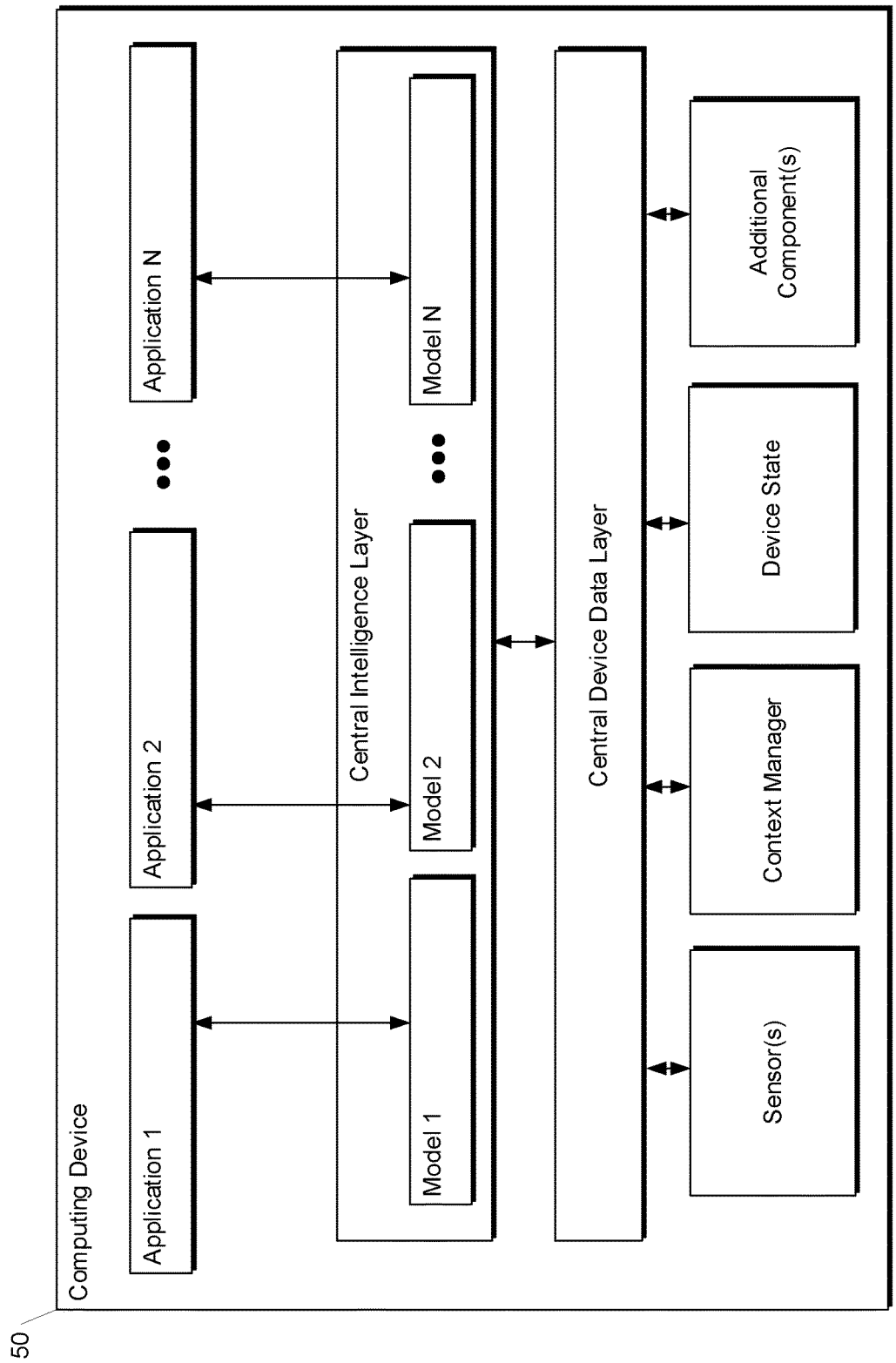
FIG. 1C depicts a block diagram of an example computing device that performs text suggestion according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
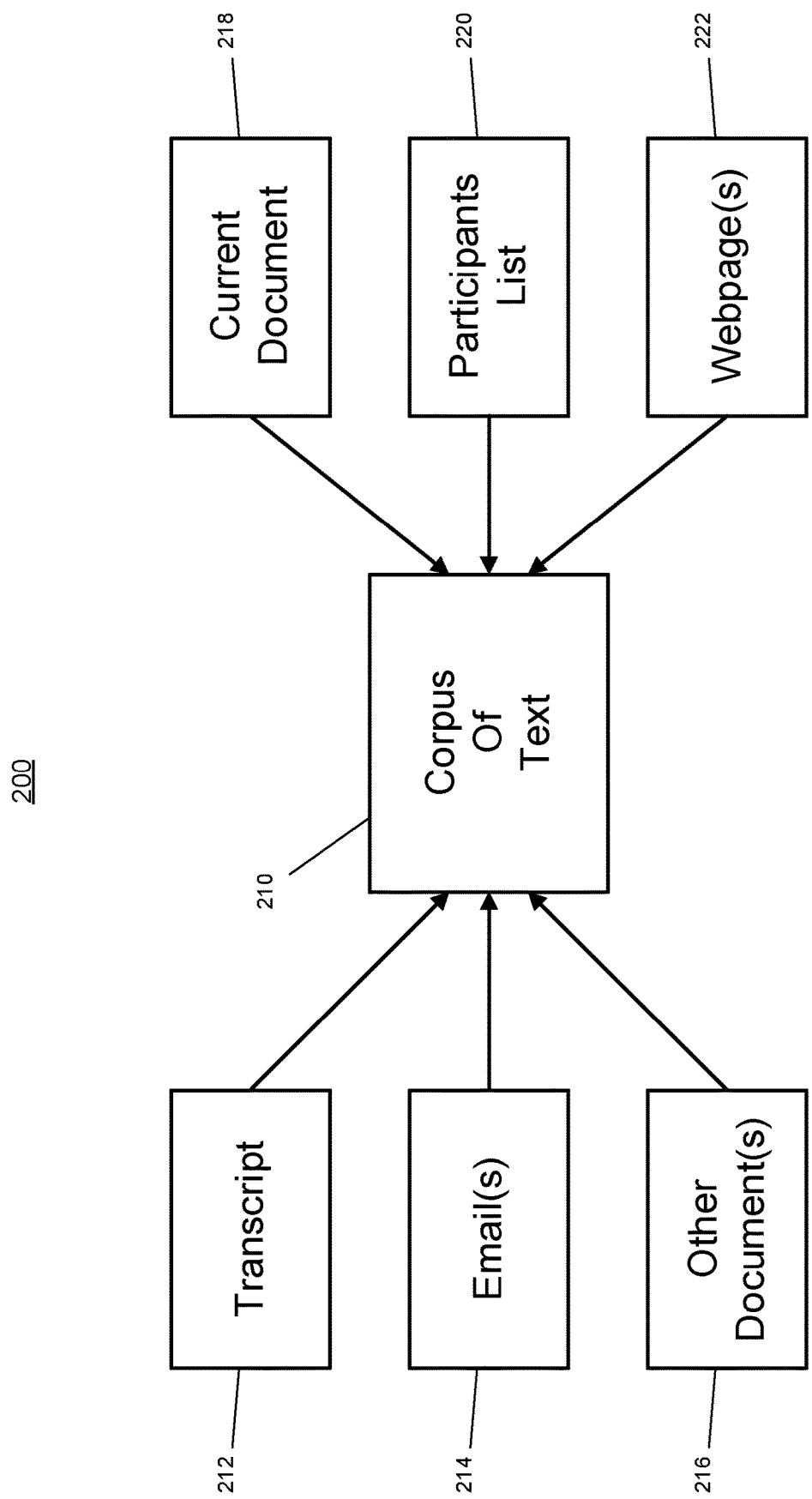
FIG. 2 depicts a block diagram of an example corpus of text system according to example embodiments of the present disclosure.

FIG. 2 depicts a block diagram of an example corpus of text system 200 according to example embodiments of the present disclosure. In some implementations, the corpus of text system 200 is trained to obtain text from a variety of sources 212, 214, 216, 218, 220, and 222 related to a user situation and, as a result of receipt of the obtained text, generate a corpus of text 210. Thus, in some implementations, the corpus of text system 200 can include a corpus of text 210 that is operable to store textual tokens for generating text suggestions based on a user situation.

The corpus of text system 200 can leverage one or more sources associated with a context to generate a corpus of text 210 to then be used for generating text suggestions. In this example, the system and method determined a context, determined the context is associated with the text entry, and determined a plurality of sources are associated with the context. The sources, in this example corpus of text system 200, include one or more transcripts 212, one or more emails 214, one or more other documents 216, the document being edited 218, a participants list 220, and one or more webpages 222.

More specifically, generating a corpus of text 210 can include parsing the contents of the sources and obtaining key words or phrases. In some implementations, the system can determine the nouns, verbs, adjectives, etc. in each source, and then storing the nouns, verbs, adjectives, etc. based on the respective parts of speech to enable the system to generate text suggestions based at least in part on the parts of speech predicted to be inputted next.

In some implementations, the one or more transcripts 212 can be drafted by a stenographer, a meeting secretary, or one or more other individuals. The one or more transcripts 212 may be automatically generated using speech recognition. In some implementations, the one or more transcripts 212 may be generated as part of a closed caption generated during a videoconference or teleconference. Moreover, in some implementations, the transcripts 212 may be generated by obtaining the closed caption from a meeting to generate a holistic transcript 212. In some implementations, the one or more transcripts 212 can include a transcript from the determined associated meeting, can include transcripts from earlier meetings, can include transcripts from related meetings, and/or can include per-speaker transcripts, in which different speakers or participants can have dedicated transcripts.

The one or more emails 214 can include a meeting invitation for the meeting the user is attending/has attended. The one or more emails may be other emails related to the user situation, such as communications between two participants of a meeting or an email sent at the same time of day frequently by the user.

The one or more other documents 216 can include documents in the same folder as the currently edited document 218 or can be documents referencing a meeting or other user situation. In some implementations, the other documents 216 can include documents edited at a similar time of day or week as the current document being edited.

Obtaining text from the current document 218 can include parsing previously entered text to determine patterns to obtain key words and phrases.

The participants list 220 can be processed to obtain participant names and/or participant contact information. The names or contact information can then be used for predicted text entry such as suggesting a participant email for the "to" field when drafting an email or for populating participant names when documenting participants or generating meeting notes.

In some implementations, the one or more webpages 222 can be webpages discussing or referencing content related to a user situation (e.g., the webpages 222 may be webpages discussing the topic of a user-attended meeting). Alternatively and/or additionally, the webpages 222 may be webpages visited during, before, or after a meeting or other user situation. The webpages may be webpages visited previously at a similar time to a current user time (e.g., the same time of day but the day before).

Figure 3:
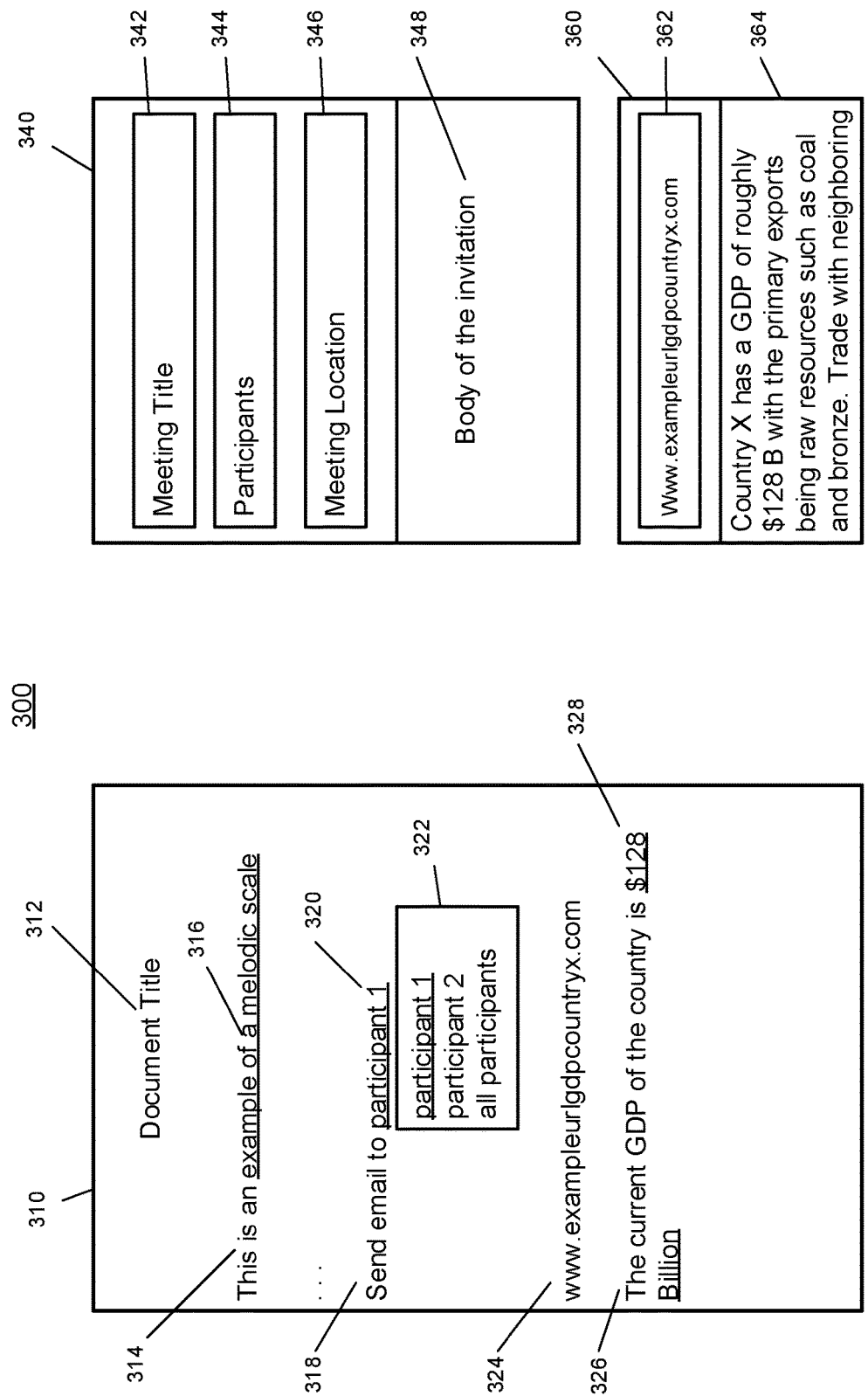
FIG. 3 depicts an illustration of an example text suggestion system according to example embodiments of the present disclosure.

FIG. 3 depicts an illustration of an example text suggestion system 300 according to example embodiments of the present disclosure. The text suggestion system 300 can leverage text from one or more sources 340 and 360 to provide text suggestions 316, 320, 322, and 328 to edit a document 310.

The illustrated example text suggestion system 300 includes a document 310 being edited by a user. The document 312 includes a document title 312 which can be manually input or may be auto-populated based on past interactions, the purpose of the document, and/or based on the determined context. Moreover, the document 310 can be configured to be edited in response to one or more inputs for text entry. For example, "This is an" 314 can be entered in response to inputs by a user. In response to the inputs, the system 300 can generate the text suggestion "example of a melodic scale" 316 based on past user interactions or based on a corpus of text generated based on one or more sources (e.g., a document discussing musical scales) associated with a context determined by the system. The text suggestion can be displayed as underlined, highlighted, italicized, bolded, or as another color.

In some implementations, the context-based text suggestion based on the corpus of text can work as an isolated text suggestion system. Alternatively, in some implementations, the context-based text suggestion based on the corpus of text can work in tandem with other models to provide text suggestions based on context and past user interactions. For example, in some implementations, past user interactions can be added to the corpus of text, such that the text suggestion can be generated based on obtained text related to a user situation or based purely on previous user interactions. Moreover, in some implementations, language models, known phrases, and dictionaries may be used to add to the corpus of text. Non-context related data may be weighted less favorably than obtained text from context-associated sources.

In the depicted example 300, the document 310 has been determined to be associated with a context, and the context has been determined to be associated with a meeting invite 340 sent via email and a webpage 360. The meeting invite 340 and the webpage 360 can be processed to obtain a plurality of text to generate a corpus of text to be used to generate text suggestions.

The meeting invitation, or meeting invite 340, can include a meeting title 342, a participants list 344, a meeting location 346, and a body of the invitation 348. In some implementations, the document title 312 may be auto-populated to replicate the meeting title 342. The participants list 344 can be used to obtain participant names and/or participant contact information. The participant list 344 information can be used for generating text suggestions. For example, the user may input "Send email to" 318. In response to the user input, the system can determine the obtained text from the participants list 344 is associated with the user input. Based on the association, the system can generate text suggestions 320 and 322 including participant names and/or participant contact information. The top text suggestion 320 can be displayed as underlined or highlighted, and in some implementations, the system 300 may display a plurality of text suggestions displayed in a drop down menu 322. The meeting location 346 can be a physical location, a phone number, a link to a virtual meeting, or meeting ID for a video conference. The meeting location 346 can be obtained and may be suggested as a subheading. Moreover, one or more words or phrases from the body of the invitation 348 may be obtained to generate the corpus of text.

The webpage 360 can include a URL 362 and one or more content sections 364. The association between the webpage 360 and the context can be determined based on the URL 362 being referenced 324 in the document 310, can be determined based on the contents of the webpage 364, and/or based on the time of when the webpage 360 was visited. For example, if the webpage 360 was visited shortly before or after the meeting or during the meeting, the webpage 360 may be determined as associated with the context (e.g., the meeting).

The contents of the webpage 364 can be parsed and obtained to generate textual tokens to be added to the corpus of text. The textual tokens can then be associated with inputs by a user to generate text suggestions. For example, the user may input "The current GDP of the country is" 326. The system 300 can determine the user is likely referring to the statistic found in the webpage 360; therefore, the system 300 can generate and provide "$128 Billion" 328 as a text suggestion. The user may then select the text suggestion via one or more inputs, and the system 300 can then input the text suggestion as a text entry.

Figure 4:
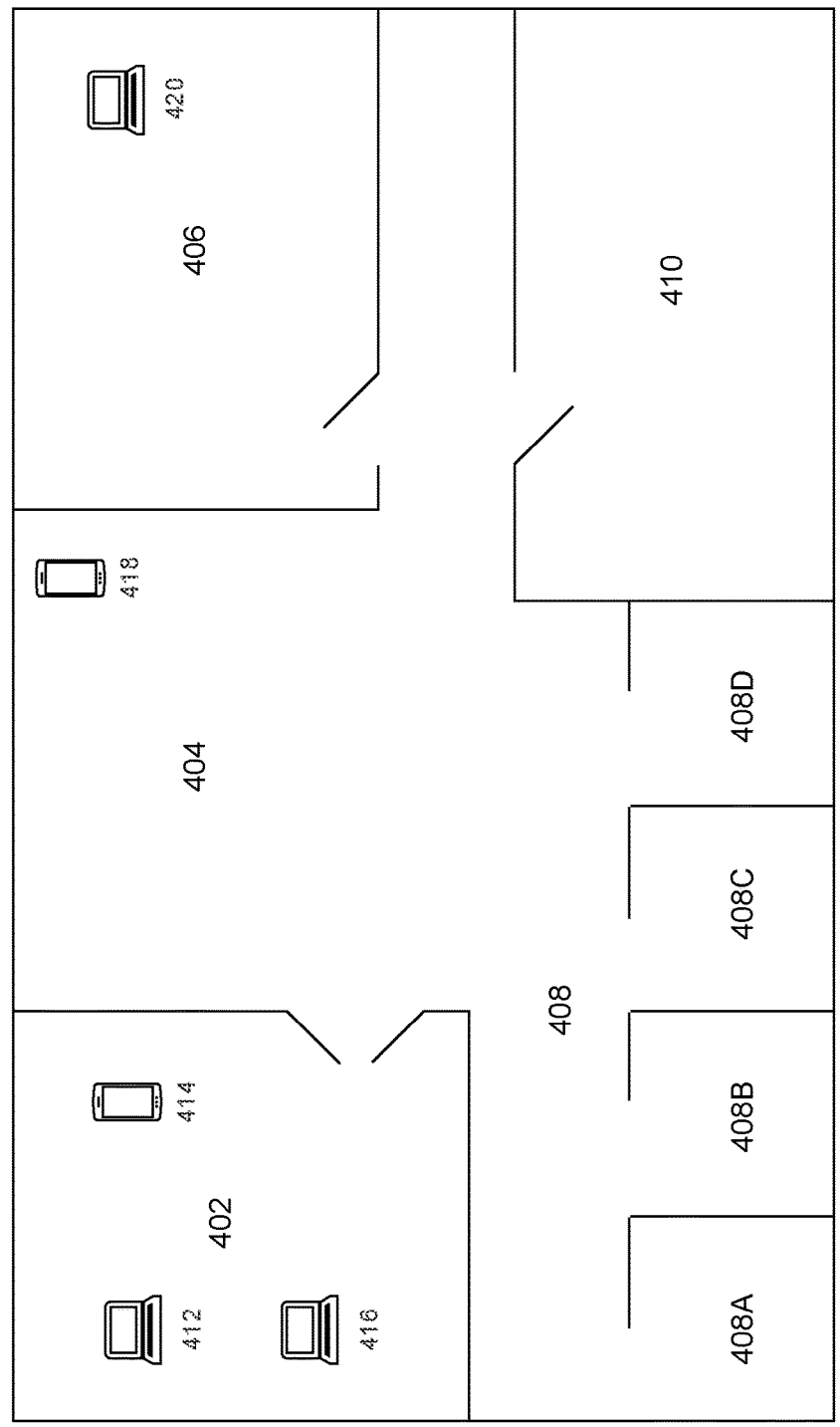
FIG. 4 depicts an illustration of an example office space environment according to example embodiments of the present disclosure.

FIG. 4 depicts an illustration of an example office space environment 400 according to example embodiments of the present disclosure. In some implementations, the office space environment 400 can include a plurality of rooms and cubicles. For example, the office space environment 400 can include one or more meeting rooms 402 and 406, an employee lounge 410, a reception area 404, and a row of cubicles 408. Thus, in some implementations, the office space environment 400 can include meeting rooms 402 and 406 that are operable to hold meetings with a plurality of participants.

The systems and methods disclosed herein can determine a user situation (e.g., a user is attending a meeting) based on the location of one or more user devices. The illustrated office space environment 400 includes a plurality of locations the user and other participants can be determined to be located.

For example, a user's office can be a cubicle 408B along the line of cubicles 408. If the user is determined to be in their cubicle 408B, the text suggestions can be different than if the user is determined to be in any other location. For example, if the user is determined to be in 408A, the text suggestions for the user may be based at least in part on one or more sources related to the colleague in that cubicle, such as communications between that colleague and the user. Moreover, different text suggestions can also be provided based on the user being in 408C or 408D.

Additionally and/or alternatively, if the user is determined to be in the employee lounge 410, the corpus of text generated to use for generating text suggestions may be generated based on other sources viewed, edited, or created previously while in that room 410. Moreover, the user may tend to personal matters while in the employee lounge 410; therefore, the corpus of text may be generated based on sources related to personal matters.

Determining a user location can involve locating one or more user devices. For example, a user's mobile device 418 can be determined to be in the reception area 404; therefore, the user can be determined to not be involved in the meetings in the meeting rooms 402 and 406.

Alternatively, if the user is in a meeting in the first meeting room 402, the user's laptop 412 may be determined as being located in the meeting room 402. The determined location in the meeting room 402 can be used to determine the user is in a meeting. Moreover, the system may determine that two other participants are at the meeting based on participant one's laptop 416 and participant two's mobile phone 414. Moreover, the colleague 420 in the second meeting room 406 may be determined to not be in the meeting and can be excluded from the participants list. Based on the determined locations, the corpus of text can be generated based on documents displayed in the meeting room, a recording of the meeting, sources viewed and edited by participants, and/or the generated participants list.

Figure 5:
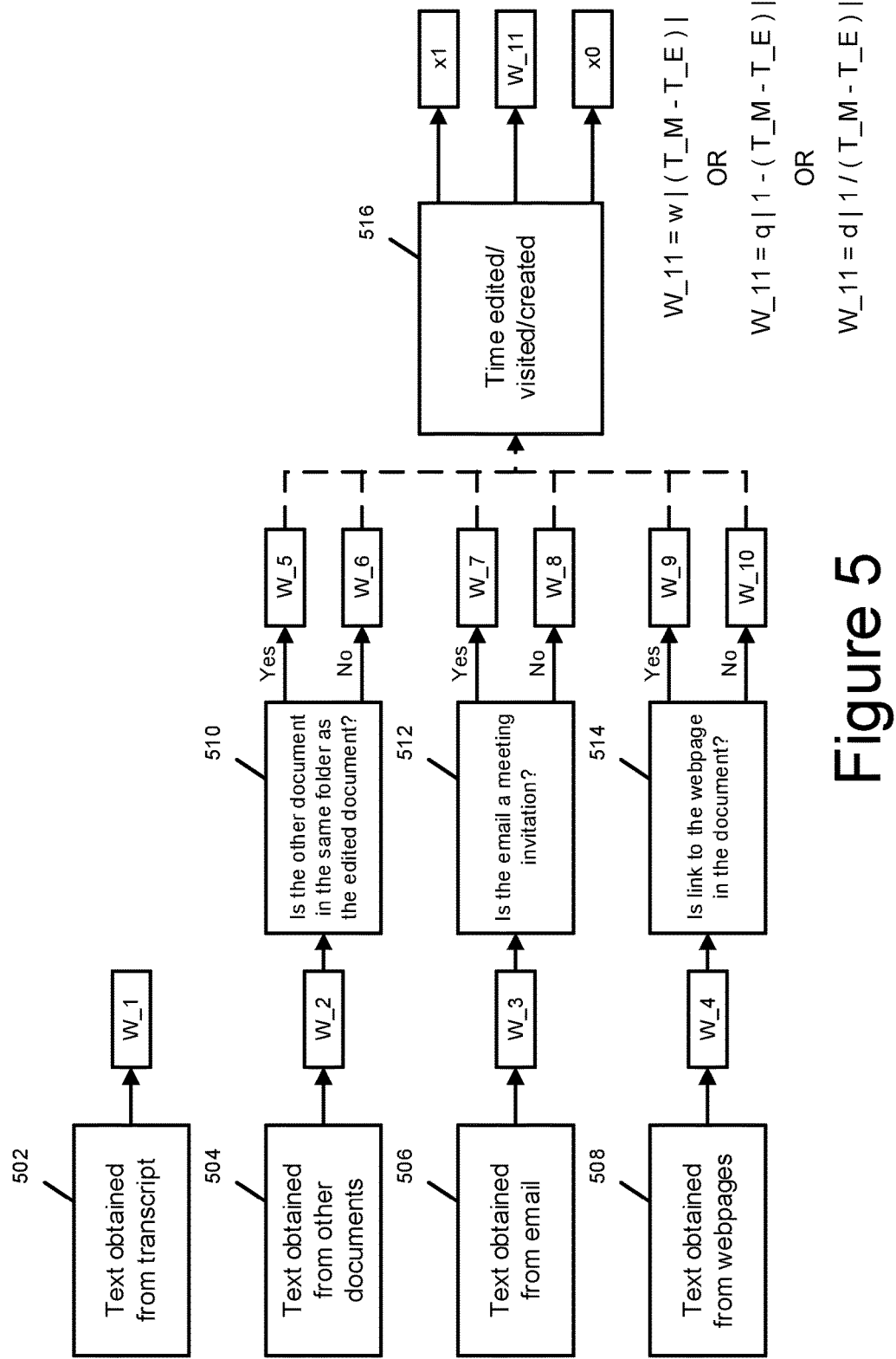
FIG. 5 depicts a block diagram of an example weighting model according to example embodiments of the present disclosure.

FIG. 5 depicts a block diagram of an example weighting model 500 according to example embodiments of the present disclosure. In some implementations, the weighting model 500 is trained to receive obtained text from a plurality of sources 502, 504, 506, and 508 associated with a user situation (e.g., a user is attending a meeting) and, as a result of receipt of the obtained text, weighting the obtained text based on the respective source. Thus, in some implementations, the weighting model 500 can include various weighting adjustments based on information related to the source.

The weighting model 500 can be utilized to provide preferences to text suggestions generated based on obtained text from particular sources. In particular, text obtained from the transcript of a meeting 502 can be given a weight (W_1), which can be given a heavier weight than text obtained from one or more emails 506 that have a weight (W_3). Therefore, text suggestions based on text obtained from the transcript 502 can be given priority over a text suggestion based on text obtained from an email 506.

The weighting model 500 can provide further weighting adjustments based on other information associated with the obtained text. In the depicted example 500, the text obtained from the transcript 502 is given weight (W_1), the text obtained from the other documents 504 is given weight (W_2), the text obtained from emails 506 is given weight (W_3), and the text obtained from webpages 508 is given weight (W_4). Text obtained from other documents 504 can be differentiated based on whether the other document is in the same folder as the edited document 510. If the other document is in the same folder, text obtained from that document can be given weight (W_5) or may be adjusted by a given proportion. If the other document is not in the same folder, text obtained from that document can be given weight (W_6) or may be adjusted by a given proportion. In some implementations, the weight (W_5) is heavier, and more favorable, than weight (W_6); therefore, text obtained from other documents in the same folder as the edited document can be more likely to be used for text suggestion generation than text obtained from other documents not in the same folder.

Alternatively and/or additionally, the weight of text obtained from emails 506 can be adjusted based on whether the email is the meeting invitation for the respective meeting 512. If the email is the meeting invitation, the text obtained from that email can be given weight (W_7) or adjusted by (W_7). If the email is not the meeting invitation, the text obtained from that email can be given weight (W_8) or adjusted by (W_8). In some implementations, weight (W_7) can be more favorable than (W 8).

Alternatively and/or additionally, the weight of text obtained from webpages 508 can be adjusted based on whether the webpage is linked to in the document being edited 514. If the webpage is linked, the text obtained from that webpage can be given weight (W_9) or adjusted by (W_9). If the webpage is not linked, the text obtained from that webpage can be given weight (W_10) or adjusted by (W_10). In some implementations, weight (W_9) can be more favorable than (W_10).

In some implementations, text obtained from a source may be used for generating a text suggestion based on the time the source was edited/visited/created 516. In some implementations, the systems and methods may determine which sources to obtain text from based at least in part on when the source was edited, visited, or created. The systems and methods can have a threshold time, such that if the source was edited, visited, or created past the threshold time then the source may not be used for generating a corpus of text. For example, if a threshold time is within an hour from the user situation (e.g., a user-attended meeting), then the source can be used for generating the corpus of text. Therefore, a webpage visited during a meeting and a document created 15 minutes before the meeting can be used, but a webpage viewed the day before may not be used.

In some implementations, the timeliness of the source may be used to adjust the weighting of the obtained text by weight (W_11). Weight (W_11) can be an adjusted weighting system based on a time difference between the user situation (e.g., a user-attended meeting) and the time the source was edited, visited, or created by the user. The adjusted scale for weight (W_11) may be denoted as [W_11=w|(T_M−T_E)|], such that (T_M) is the time of the user situation, and (T_E) is the time of the source being edited, visited, or created by the user. The difference between the time of the user situation (e.g., the time of the user-attended meeting) and the time the source is edited/visited/created can be taken as an absolute value and multiplied by a scalar weight (w) to generate a weight (W_11) to adjust the obtained text weighting.

In some implementations, weight (W_11) can vary based on a decay model, which can be implemented in a variety of ways, including, but not limited to, [W_11=w|(T_M−T_E)|]. Alternatively and/or additionally, weight (W_11) can be denoted as [W_11=q|1−(T_M−T_E)|] with scalar weight (q) or [W_11=d|1/(T_M— T_E)|] with scalar weight (d).

Additionally and/or alternatively, in some implementations, the weighting model can further include weighting adjustments based on the location of a user's computing device, the state of the device (e.g., idle or active), and/or a participant hierarchy. For example, in some implementations, text obtained from sources regarding locations of closer proximity to the user's computing device may be provided more weight. Another example, a user's computing devices being idle can affect the text obtained to generate the corpus of text, and the weighting of text obtained can be adjusted or determined based in part on the devices being active or idle. Moreover, a participant hierarchy can be used to determine the sources for obtaining text and may be used to determine obtained text weighting, such that text obtained from sources generated or visited by a speaker can be weighted more favorably than text obtained from sources visited by an "optional" participant (e.g., participants in the "optional" line of a meeting invitation).

Example Methods

Figure 6:
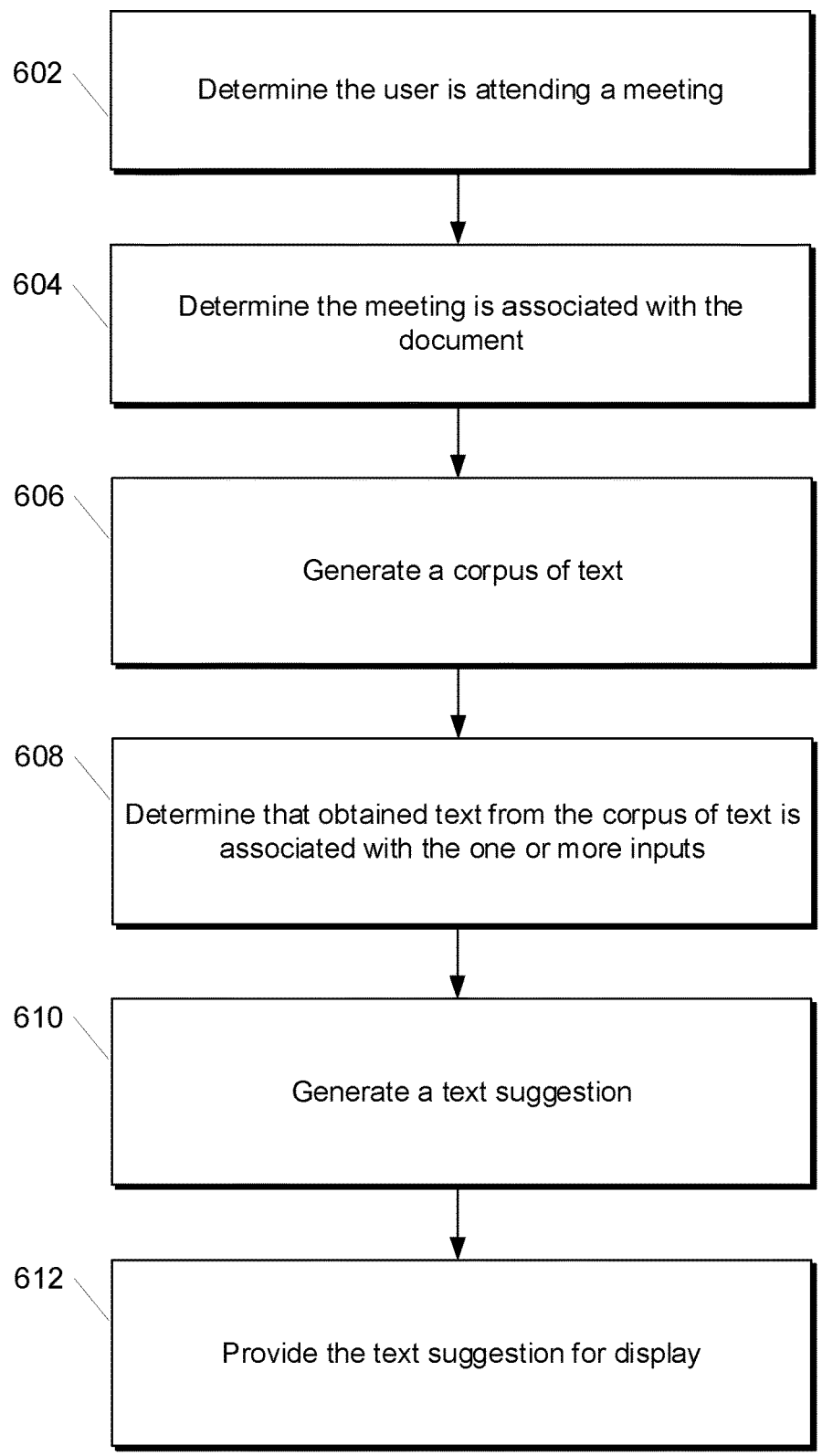
FIG. 6 depicts a flow chart diagram of an example method to perform text suggestion based on meeting attendance according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can determine the user is attending a meeting. Determining the user is attending a meeting can include obtaining and processing a user calendar to determine the user has a meeting scheduled at that time. In some implementations, determining the user is attending a meeting can involve processing one or more emails or other communications between the user and other meeting participants to determine a meeting is scheduled. Alternatively and/or additionally the determination may be based on determining a user's device is located in a meeting location or in proximity to one or more meeting participants' devices.

At 604, the computing system can determine the meeting is associated with the document. The document can be a document that the system receives one or more inputs to edit by the user. In some implementations, the document can be an email, a text document, a web application, etc. Determining the meeting is associated with the document can involve determining the document is being edited during a meeting or near the time of the meeting. In some implementations, an association can be determined based on the content of the document, and/or based on past interactions by the user.

At 606, the computing system can generate a corpus of text. Generating a corpus of text can include determining one or more sources associated with the meeting and obtaining text from the one or more sources. The obtained text can include key words or phrases and can be stored as textual tokens. The one or more sources can include portions of the document, other documents, one or more emails, one or more webpages, and/or a transcript for the meeting.

At 608, the computing system can determine that obtained text from the corpus of text is associated with the one or more inputs. The obtained text can be a textual token determined to be associated with the one or more inputs. In some implementations, the association can be based on matched language or can be determined based on a determined pattern.

At 610, the computing system can generate a text suggestion. The text suggestion can be generated based on the obtained text and the one or more inputs. The text suggestion can include obtained text or can be derived based on a combination of the obtained text and the text entry of the one or more inputs.

At 612, the computing system can provide the text suggestion for display. The text suggestion can be provided inside the document being edited as underlined, highlighted, italicized, as a different color, and/or in a drop down menu. In some implementations, the text suggestion can be displayed in the user interface of a graphical keyboard.

Figure 7:
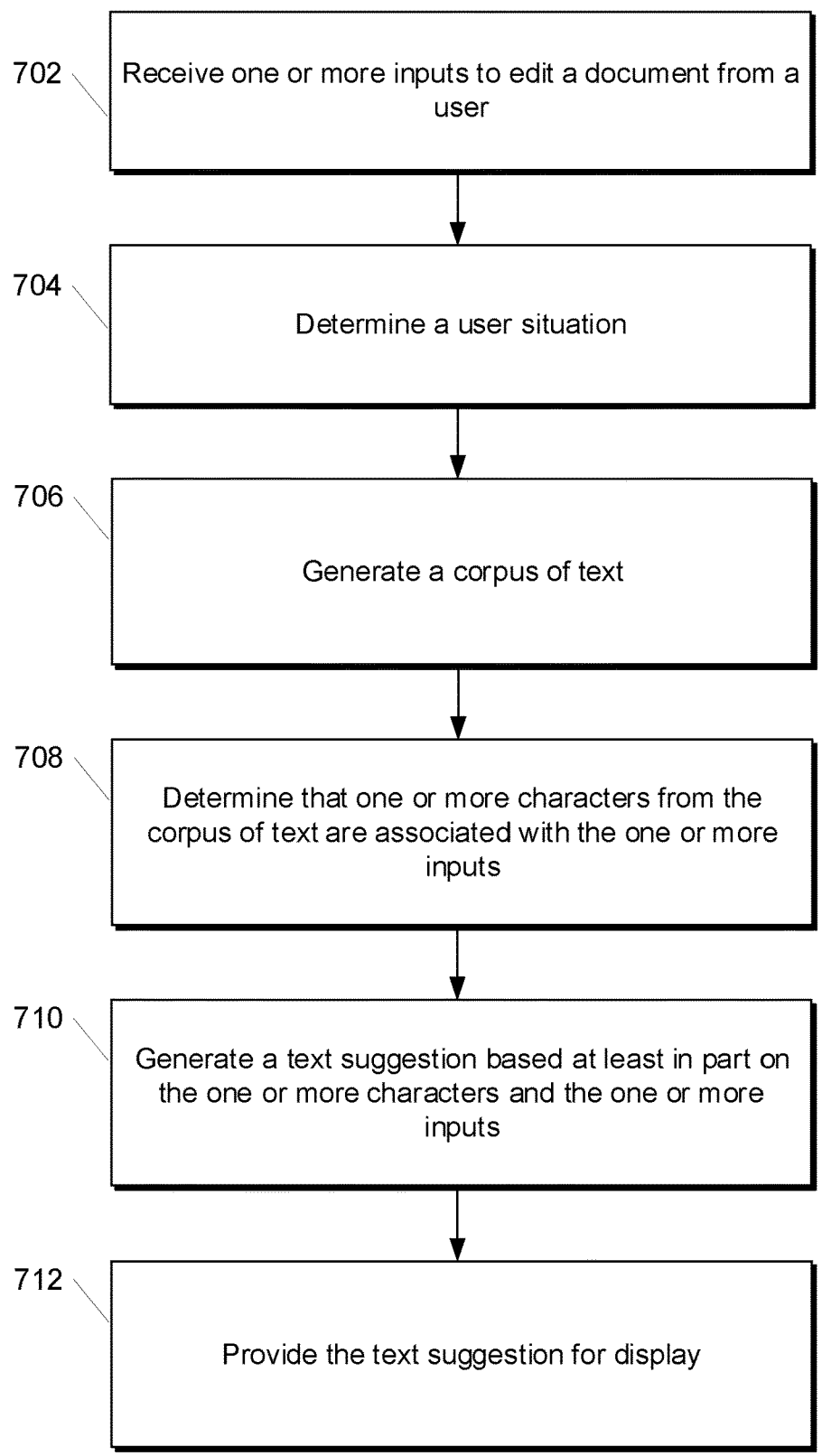
FIG. 7 depicts a flow chart diagram of an example method to perform text suggestion based on a determined situation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can receive one or more inputs to edit a document from a user. Alternatively and/or additionally, the received one or more inputs can be inputs for text entry. In some implementations, the document can be an email or a meeting notes document.

At 704, the computing system can determine a user situation. The user situation can be based on past interactions by the user and/or can be determined based on a user's calendar, user communications, a time of day, and/or a user location. Alternatively and/or additionally, a user situation can be determined based on the language spoken or typed by the user.

At 706, the computing system can generate a corpus of text. A corpus of text can be generated based on past user interactions and sources associated with the user interaction. Generating the corpus of text can involve obtaining one or more characters from one or more sources associated with the user situation. For example, if the user situation is a time of day, a plurality of characters can be extracted from documents edited at that time of day in the past and/or can be extracted from webpages opened previously at that same time of the day in the past.

At 708, the computing system can determine that one or more characters from the corpus of text are associated with the one or more inputs. Determining the association can be based on an N gram analysis or can be based on the parts of speech of the extracted text and inputted text.

At 710, the computing system can generate a text suggestion based at least in part on the one or more characters and the one or more inputs. The text suggestion can include the extracted characters and/or the one or more inputs.

At 712, the computing system can provide the text suggestion for display. The text suggestion can be displayed in a variety of manners and can be displayed in a dropped down menu or directly in the document.

Figure 8:
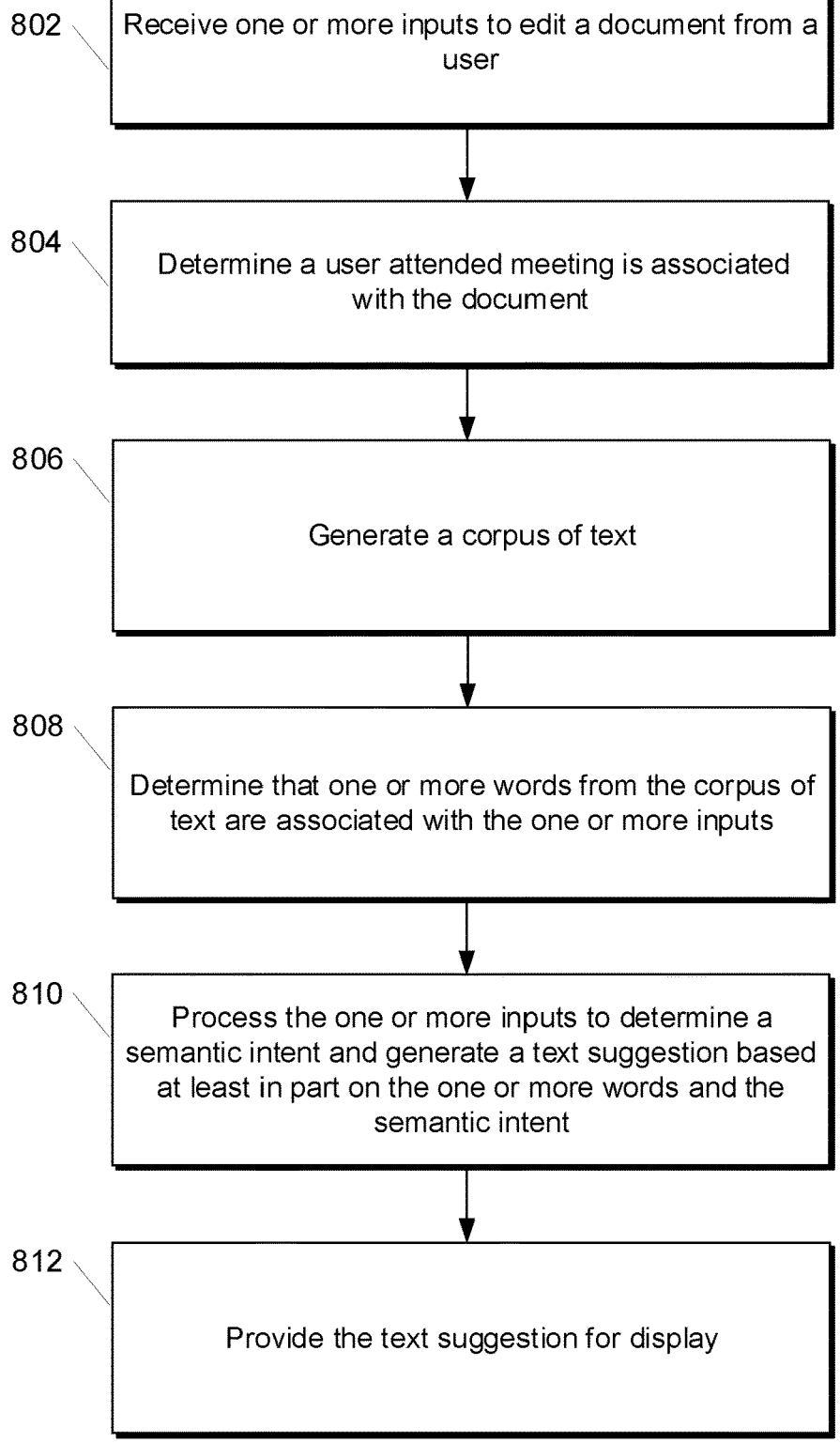
FIG. 8 depicts a flow chart diagram of an example method to perform text suggestion based on meeting attendance according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can receive one or more inputs to edit a document from a user. The one or more inputs can be inputs to enter one or more text characters. The text characters can be a portion of a word, an abbreviation, or a completed word.

At 804, the computing system can determine a user-attended meeting is associated with the document. The association can be based on a meeting invite, the contents of the document, past user interactions, and/or based on who the document is shared with. For example, if the document is shared with a plurality of participants from the meeting, then the association can be inferred.

At 806, the computing system can generate a corpus of text. The corpus of text can include text obtained from a plurality of sources including emails, text files, webpages, transcripts, etc. The sources can be associated with meeting directly or indirectly. The meeting invite and the transcript of the meeting may be the most prevalent text of the corpus of text.

At 808, the computing system can determine that one or more words from the corpus of text are associated with the one or more inputs. The one or more words can be determined to be associated with the inputs based on a trained language model, a similarity score, a determined pattern, or a variety of other determination techniques.

At 810, the computing system can process the one or more inputs to determine a semantic intent and generate a text suggestion based at least in part on the one or more words and the semantic intent. The semantic intent can be determined based on previously input content in the document, the structure and content of previously generated documents, and/or based on the content and structure of viewed sources. The text suggestion can include the one or more words, translations of the one or more words, or similar words to the one or more words.

At 812, the computing system can provide the text suggestion for display. The text suggestion can be displayed in a variety of ways and may be inputted into the document upon user selection.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
    receiving, by a computing system comprising one or more processors, one or more inputs for text entry from a user;
    determining, by the computing system, the user is attending a meeting;
    determining, by the computing system, the meeting is associated with the text entry, wherein the meeting comprises a plurality of participants, and wherein the plurality of participants comprises the user;
    generating, by the computing system, a corpus of text, wherein the corpus of text comprises a plurality of textual tokens associated with the meeting, wherein the textual tokens are obtained from one or more sources associated with the meeting, wherein generating the corpus of text comprises:
    determining a webpage is associated with the meeting based on the webpage being accessed during the meeting;
    determining whether the webpage was accessed based on a typed in uniform resource locator or based on a clicked uniform resource locator; and
    wherein one or more textual tokens are obtained from the webpage, wherein the one or more textual tokens associated with the webpage are weighted based on a duration of time the webpage is viewed, wherein the one or more textual tokens are weighted more heavily the longer the duration of time, and wherein the one or more textual tokens are further weighted based on whether the webpage was accessed based on the typed in uniform resource locator or based on the clicked uniform resource locator, wherein the textual tokens are weighted differently for webpages accessed based on the typed in uniform resource locator than webpages accessed based on the clicked uniform resource locator;
    determining, by processing the corpus of text and the one or more inputs with a machine-learned model of the computing system, that obtained text from the corpus of text is associated with the one or more inputs, wherein the obtained text is associated with the webpage, wherein the machine-learned model comprises one or more neural networks;
    generating, by the computing system, a text suggestion based at least in part on the obtained text and the one or more inputs; and
    providing, by the computing system, the text suggestion for display.

2. The computer-implemented method of claim 1, wherein the one or more sources comprises one or more emails associated with the meeting; wherein the one or more emails are at least one of addressed to one or more of the plurality of participants or from one or more of the plurality of participants.

3. The computer-implemented method of claim 1, wherein the one or more sources comprises one or more previously edited documents.

4. The computer-implemented method of claim 1, wherein generating the corpus of text comprises obtaining text based at least in part on a participant hierarchy associated with the meeting.

5. The computer-implemented method of claim 1, further comprising:
    determining, by the computing system, the meeting is a particular meeting type; and
    wherein generating, by the computing system, the corpus of text comprises obtaining text from the one or more sources based on the particular meeting type.

6. The computer-implemented method of claim 1, wherein determining, by the computing system, the user is attending the meeting comprises: determining, by the computing system, that the user is in proximity to at least one of a meeting location or one or more meeting participants.

7. The computer-implemented method of claim 1, wherein determining, by the computing system, the user is attending the meeting comprises: determining, by the computing system, that the user added the meeting to a calendar.

8. The computer-implemented method of claim 1, further comprising:
    wherein generating a text suggestion comprises:

generating, by the computing system, a first text suggestion and a second text suggestion based at least in part on the obtained text and the one or more inputs; and determining, by the computing system, respective weights for the first text suggestion and the second text suggestion; and wherein providing the text suggestion comprises:

providing, by the computing system, at least one of the first text suggestion or the second text suggestion based at least in part on the respective weights.

9. The computer-implemented method of claim 8, wherein determining respective weights is based at least in part on content in a document being edited by the text entry.

10. The computer-implemented method of claim 8, wherein the determining the weight is based at least in part on an association level between the meeting and a source of the obtained text the text suggestion is based on for generation.

11. The computer-implemented method of claim 8, wherein the determining the weight is based at least in part on a timeliness of a source of the obtained text the text suggestion is based on for generation.

12. The computer-implemented method of claim 8, wherein the determining the weight is based at least in part on one or more past selections of past text suggestions based on one or more characters from a source of the obtained text the text suggestion is based on for generation.

13. The computer-implemented method of claim 8, wherein the determining the respective weights comprises:

determining, by the computing system, a first source type of a first source of the obtained text on which the first text suggestion is based;

determining, by the computing system, a second source type of a second source of the obtained text on which the second text suggestion is based; and determining, by the computing system, the respective weights based at least in part on the first source type and the second source type.

14. The computer-implemented method of claim 13, wherein a closed caption source is provided more weight than other source types.

15. The computer-implemented method of claim 1, further comprising:

receiving, by the computing system, a user selection of the text suggestion; and editing, by the computing system, a document to include content from the text suggestion.

16. The computer-implemented method of claim 1, wherein determining, by the computing system, the meeting is associated with the text entry comprises:

determining, by the computing system, that a document being edited in response to the one or more inputs is at least one of shared with at least a portion of the plurality of participants, the meeting is referenced in the document, or the document is shared in a meeting invite.

17. A computing system, the computing system comprising:

one or more processors;

one or more non-transitory computer readable media that collectively store instructions that, when executed by the one or more processors, cause the computing system to perform operations, the operations comprising:

receiving one or more inputs to edit a document from a user;

determining a user situation;

determining the user situation is associated with the document, wherein the user situation is descriptive of a user attending a meeting;

generating a corpus of text, wherein the corpus of text comprises a plurality of characters associated with the user situation, wherein the plurality of characters are obtained from one or more sources associated with the user situation, wherein generating the corpus of text comprises:

determining a webpage is associated with the meeting based on the webpage being accessed during the meeting;

determining whether the webpage was accessed based on a typed in uniform resource locator or based on a clicked uniform resource locator; and wherein one or more textual tokens are obtained from the webpage to generate the corpus of text, wherein the one or more textual tokens associated with the webpage are weighted based on a duration of time the webpage is viewed, wherein the one or more textual tokens are weighted more heavily the longer the duration of time, and wherein the one or more textual tokens are further weighted based on whether the webpage was accessed based on the typed in uniform resource locator or based on the clicked uniform resource locator, wherein the textual tokens are weighted differently for webpages accessed based on the typed in uniform resource locator than webpages accessed based on the clicked uniform resource locator;

determining, by processing the corpus of text and the one or more inputs with a machine-learned model comprising one or more neural networks, that one or more characters from the corpus of text are associated with the one or more inputs, wherein the one or more characters are associated with the webpage;

generating a text suggestion based at least in part on the one or more characters and the one or more inputs; and providing the text suggestion for display.

18. The computing system of claim 17, further comprising:

determining a location of the user based on locating a user device; and wherein the text suggestion is based at least in part on a current location of the user.

19. The computing system of claim 17, further comprising:

obtaining speech data descriptive of one or more words spoken by the user;

determining a language spoken by the user based on the speech data; and wherein the text suggestion is based at least in part on the language spoken by the user.

20. One or more non-transitory computer readable media that collectively store instructions that, when executed by one or more processors, cause a computing system to perform operations, the operations comprising:

receiving one or more inputs to edit a document from a user;

determining a user-attended meeting is associated with the document, wherein the user-attended meeting comprises a plurality of participants, and wherein the plurality of participants comprises the user;

generating a corpus of text, wherein the corpus of text comprises a plurality of words associated with the user-attended meeting, wherein the plurality of words are obtained from one or more sources associated with the user-attended meeting, wherein generating the corpus of text comprises:
determining a webpage is associated with the user-attended meeting based on determining the webpage is being accessed during the user-attended meeting;
determining whether the webpage was accessed based on a typed in uniform resource locator or based on a clicked uniform resource locator; and
wherein a subset of the plurality of words are obtained from the webpage, wherein the one or more textual tokens associated with the webpage are weighted based on a duration of time the webpage is viewed, wherein the one or more textual tokens are weighted more heavily the longer the duration of time, and wherein the one or more textual tokens are further weighted based on whether the webpage was accessed based on the typed in uniform resource locator or based on the clicked uniform resource locator, wherein the textual tokens are weighted differently for webpages accessed based on the typed in uniform resource locator than webpages accessed based on the clicked uniform resource locator;
determining, by processing the corpus of text and the one or more inputs with a machine-learned model comprising one or more neural networks, that one or more words from the corpus of text are associated with the one or more inputs, wherein the one or more words are associated with the webpage;
processing the one or more inputs to determine a semantic intent;
generating a text suggestion based at least in part on the one or more words and the semantic intent; and
providing the text suggestion for display.

* * * * *